Figure 1:
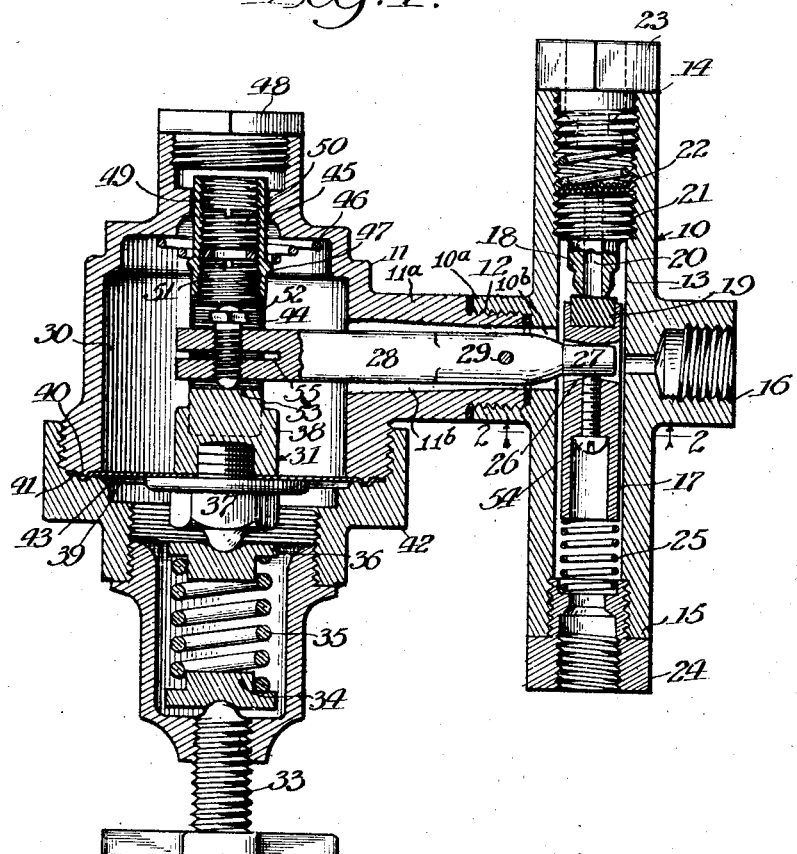

Dec. 18, 1928.

P. M. GRANT 1,695,330

FLUID PRESSURE REGULATOR

Filed Feb. 19, 1926

Inventor
Patrick M. Grant
by Sprinkle & Smith
Attys.

Patented Dec. 18, 1928.

1,695,330

UNITED STATES PATENT OFFICE.

PATRICK M. GRANT, OF CHICAGO, ILLINOIS, ASSIGNOR OF ONE-HALF TO JAMES G. GILBERT.

FLUID-PRESSURE REGULATOR.

Application filed February 19, 1926. Serial No. 89,313.

The invention relates to fluid pressure regulators and has as one of its principal objects the provision of a simplified structure whereby fluid at relatively high pressure may be regulated, controlled and brought to a desired working pressure and be maintained at said pressure.

It is a feature of the invention to provide a construction whereby a valve employed in the device may be adjusted to accomplish the above object and to combine an adjusting mechanism and lever operable by the adjusting mechanism for actuating said valve to cause its regulation, said adjusting mechanism and lever being automatically operable to close the valve to control or completely close the valve and prevent the escape of fluid therethrough should pressure beyond a predetermined pressure form or be caused to exist in the casing of the regulator.

In addition it is a further object to provide the valve with means tending to maintain said valve in a closed condition so that said valve will close and prevent the passage of fluid therethrough should either the regulating mechanism or the lever which connects the regulating mechanism and the valve be for any reason rendered inoperative.

It is a further object to provide operable means to independently apply a force to both the lever and said valve which force will completely close the valve when the regulating mechanism is set to permit of this.

It is a further object of the invention to provide said lever with a means whereby the valve may be adjusted so as to compensate for wear between the valve and its seat and to accomplish this adjustment without affecting the adjustment of the mechanism for regulating the fluid pressure escaping through the valve.

It is an additional object of the invention to produce a construction which dispenses with the use of stuffing or packing particularly adjacent the adjusting mechanism.

It is also a feature of the invention to provide an improved structure such as above described with a regulating or fluid pressure adjusting mechanism which will yieldingly resist the fluid pressure and vary the opening of the valve when pressure in excess of that for which the device is set occurs in the casing of the device.

In addition it is an object to combine with a mechanism such as that just referred to including a disc or diaphragm which, when flexed beyond its normal flexible limit, will be destroyed, and thus allow the valve actuating lever and its associated mechanism including the valve to assume a position in which the valve is closed to completely cut off the flow of the fluid through said valve.

The invention has these and other objects, all of which will be explained in detail and more readily understood when read in conjunction with the accompanying drawings, forming a part of this specification, it being obvious that changes and modifications may be resorted to without departing from the spirit of the appended claims setting forth novel features of my invention.

Figure 2:
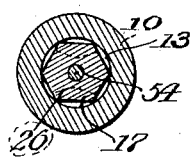

In the drawings, Fig. 1 is a central longitudinal section of a fluid regulator embodying the features of the invention, and Fig. 2 is a section taken on the line 2—2 of Fig. 1, looking in the direction of the arrows.

The casing of the regulator is composed of a tubular member or portion 10 and a housing 11 which are detachably or separably connected by means of the threads 12 formed on a laterally extending boss 10$^a$ on the tubular portion 10, and cooperating threads formed on a lateral extension 11$^a$ on the housing 11, the said boss 10$^a$ and the lateral extension 11$^a$ having formed therein the openings 10$^b$ and 11$^b$, respectively. The portion 10 is formed to provide a valve chamber or passage 13, one end of which, such as at 14, is connected to a source of fluid pressure supply which it is desired to reduce to a predetermined working pressure as the fluid is discharged at the outlet 15. This portion 10 is also provided with an extension 16 having a passage which communicates with the passage 13 and affords a means for attaching a gauge, whereby the pressure emitted from the discharge end 15 of the portion 10 may be ascertained. A valve member 17 is located in the passage 13 in a manner to move longitudinally thereof and is preferably of hexagonal cross section to provide ample surface between the valve member and the wall of the passage 13 to allow the fluid to pass the valve member and at the same time to provide means for guiding the member within the passage to prevent cramping or other displacement of the valve member therein. By reference to Fig. 1 of the drawing, it will be noted that the member 17 is of substantial dimension longitudinally as compared with its diameter and that by such a construction the member is maintained in substantially accurate alignment within the passage 13. The member 17 is adapted to co-operate with a valve seat formed on a member 18 suitably positioned within the passage 13, and for providing a suitable surface for co-operation with the valve seat, the member 17 is provided with an inset 19 of suitable material, such, for example, as casein or vulcanite. The valve seat member 18 is provided with a passage 20 and is threaded as indicated at 21 for removably securing the member 18 within the passage 13 of the portion 10. A screen 22 is located above the member 18 and a coil spring is employed to engage the screen and hold it against the end of said member 18. This spring is located between said screen and the end of the tubular threaded member 23 which is threaded into the intake end 14 of this part of the casing. The discharge end 15 of the casing 10 is provided with a tubular threaded element 24 which corresponds in structure with the member 23, and a coiled expansion spring 25 is arranged to react between an end of the member 24 and the adjacent end of the valve member 17, and thus exerts a force which will tend to maintain the valve formed by the members 17 and 18 in a closed condition.

The valve member 17 is apertured transversely as indicated at 26, the aperture being tapered in opposite directions and being provided to receive the end 27 of a lever arm 28 which is pivoted at 29 and provides a lever for moving the valve member 17 during adjustment and assists in maintaining the valve in a given position and also allows said valve member to close when certain undesirable conditions exist within the regulator. This lever 28 is mounted in the lateral extension 11ª of the casing and extends from the pivot of the lever into a pressure chamber 30 in which are mounted certain elements of a means generally designated 31, whereby the valve is adjusted to obtain the desired or reduced pressure at the discharge end 15 of the portion 10 of the casing. The adjusting means generally designated 31 includes a hand wheel 32 having the threaded portion 33 which co-operates with a follower block 34 which forms a movable seat for a coiled spring 35 which through the medium of the member 36, contacts with the rounded portion of a screw threaded member 37, transmits the action of the spring 35 to the member 38 with which one end of the lever 28 is adjustably connected.

A disc or diaphragm 39 is connected with the member 38 by means of the screw threaded member 37, the diaphragm being arranged between said members 37 and 38 and extended therefrom and clamped between the lower edge 40 of an internally screw threaded member 42. The edge 40 and the face 41 of the portions just referred to are respectively provided with a co-operating annular extension and a recess which, when the member 42 is connected with the chambered portion of the casing, crimps the diaphragm and holds the same against displacement. The member 42 is further provided with an annular edge 43 with which the diaphragm is designed to engage to sever the diaphragm, should said diaphragm be flexed beyond its normal elastic limit, to thereby cause certain elements of the structure to function and close the valve arranged in the passage 13 and maintain said valve in this closed condition.

The member 38 is designed to provide an opening 44 for the reception of an end of the lever 28 and is extended upwardly relatively to the lever and reciprocably held in an opening 45. A coiled spring 46 is arranged upon the upper end of the member 38 and reacts between the shoulder 47 of the member 38 and a wall of the portion 11 of the casing and thus provides a means for moving said member 38 endwise and in a direction opposite to the movement imparted thereto by the spring 35.

That end of the casing in which the member 38 is reciprocably mounted is closed by a cap screw 48. The upper end of the member 38 is internally threaded, as indicated at 49, to receive therein the screw threaded members 50 and 51, the lower one of which engages the setting or adjusting screw 52 carried by the lever 28. This screw 52 is provided for the purpose of compensating for wear between the valve members 17 and 18. It is manifest from the structures employed, that should leakage occur between the valve and its seat, the arrangement is such that this leakage can be eliminated without the other adjustments of the regulator.

To adjust the valve, the cap screw 48 is removed to expose and permit of access to the threaded members 50 and 51 which are also removed, thus allowing access to the screw 52. As before stated, the coiled spring 25 acts upon the valve element 17 which tends to maintain the members forming the valve in a closed condition. This action of the spring 25 is transmitted through the lever 28 to the adjusting screw 52 and thus it is manifest that rotation of the screw 52 will cause the valve member 17 to be moved toward or away from the valve seat member 18, and thereby result in the desired adjustment of the valve. The adjusting screw 52 bears against the surface 53 of the member 38 and is engaged by the screw threaded member 51 and thus assists in transmitting the action of the adjusting screw 33, springs 35 and 46 and diaphragm 39 to the lever 28 and the valve located in the passage 13 of the portion 10 of the casing. The valve portion 17 is provided with a screw 54 for engaging the adjacent end of the lever and holding said end of the lever in its proper relation in the opening 26 provided in said member 17. That end of the lever in which the setting screw 52 is mounted is split as indicated at 55 to provide a frictional resistance to prevent the unscrewing of this screw 52.

From the foregoing description of the construction of the regulator it is manifest that by adjusting the screw 33, the member 38 will, through the medium of the springs 35 and 46, be moved upwardly or downwardly, which movement will be transmitted to the lever 28 and the valve member 17, causing the adjustment of this member 17 which will vary the degree of opening of the valve, of which the member 17 is a part. The various adjustable elements remain in their adjusted position and control the pressure escaping through the valve located in the passage 13. However, should a pressure in excess of the desired pressure form within the chamber 30, this pressure is exerted upon the diaphragm which through its connection with the lever causes the valve to partially close and automatically regulates the pressure escaping through the valve. Should a condition at any time occur which creates a pressure in the chamber 30 sufficient to flex the diaphragm beyond its normal flexible limit, said diaphragm then engages the annular cutting edge 43, causing the diaphragm to be severed, at which time the spring 25 located in the passage 13 acts upon the valve member 17 and closes said valve and prevents the passage of any fluid through said valve. It is evident that the employment of a diaphragm such as 39 eliminates the necessity of the provision of a stuffing box or other packing between the reciprocable member 38 and the valve casing.

Having thus described the invention, what I claim and desire to secure by Letters Patent is:

1. A liquid pressure regulator comprising a housing having a pressure chamber formed therein, a tubular portion detachably connected intermediate its ends to said housing, an elongated valve member mounted in and slidable longitudinally with respect to said tubular portion, valve actuating means mounted in said chamber, and a lever pivotally mounted intermediate its ends in said housing and co-operable with said actuating means and said valve in a manner to control the movement of the valve at all times according to the movement of said actuating means.

2. A fluid pressure regulator comprising a housing having a pressure chamber formed therein, said housing having an opening therein adapted to communicate with said chamber, a tubular portion having a passage of circular cross section and fluid inlet and outlet ports formed therein and adapted to be detachably connected to said housing, said tubular portion having a lateral opening formed therein and adapted to co-operate with the opening formed in said housing in a manner to provide communication between said chamber and said passage, a valve having an elongated body portion of polygonal cross-sectional form slidably mounted in said passage and having an opening extending therethrough, valve actuating means positioned in said chamber, a lever arm pivotally mounted in the opening formed in said housing and adapted to extend into said chamber and said passage and having co-operable relationship with said valve and valve actuating means in a manner to control the movement of said valve by the movement of said actuating means, and means for varying the relative position of said arm and said valve actuating means.

3. A fluid pressure regulator comprising a housing having a pressure chamber formed therein and a lateral extension formed thereon, said extension having a longitudinal opening therein adapted to communicate with said chamber, a tubular portion having a passage of circular cross-section and fluid inlet and outlet ports formed therein, and having a laterally extending boss formed thereon adapted to be detachably connected to the extension formed on said housing, said lateral extending boss having an opening formed therein and adapted to co-operate with the opening formed in said lateral extension in a manner to provide communication between said chamber and said passage, a valve having an elongated body portion of polygonal cross-sectional form slidably mounted in said passage between said inlet and outlet ports and having a transversely disposed opening extending therethrough, valve actuating means positioned in said chamber, a lever arm pivotally mounted in said extension and adapted to extend into said chamber and said passage and having co-operable relationship with said valve and valve actuating means in a manner to control the movement of said valve by the movement of said actuating means, and adjustable means carried by said arm and co-operable with said valve actuating means for varying the position of said arm with respect to said valve actuating means.

4. A fluid pressure regulator comprising a housing having a pressure chamber formed therein, a tubular member detachably connected to said housing and having a passage and fluid inlet and outlet ports formed therein in axial alignment with each other and with said passage, said housing and tubular member having aligned lateral openings adapted to provide communication between said chamber and said passage, a valve seat in said tubular member, an elongated valve member slidably mounted in said tubular member and having a transversely disposed opening formed therein, fluid pressure operated valve actuating means mounted in said chamber, and a lever arm pivotally mounted in said housing and having one of its end portions extending into said chamber and adjustably connected with said valve actuating means, and having its opposite end portion extending into said tubular member and engageable with the opening formed in said valve member in a manner to move the valve member toward and away from said valve when said valve actuating means is moved under the influence of fluid pressure in said chamber.

5. A fluid pressure regulator comprising a housing having a pressure chamber formed therein, a tubular member detachably connected by screw threaded engagement to said housing and having a passage and fluid inlet and outlet ports formed therein, said housing and tubular member having aligned lateral openings adapted to provide communication between said chamber and said passage, a valve seat removably secured in said member intermediate said ports, an elongated valve member slidably mounted in said tubular member and having a transversely disposed opening formed therein, fluid pressure operated valve actuating means mounted in said chamber, a lever arm pivotally mounted in said housing and having one of its end portions extending into said chamber and operatively connected with said valve actuating means, and having its opposite end portion extending into said tubular member and engageable with the opening formed in said valve member in a manner to move the valve member toward and away from said valve when said valve actuating means is moved under the influence of fluid pressure in said chamber, and resilient means mounted in said tubular member for yieldingly holding said valve member against said seat and the opening in said valve member in substantial alignment with the lateral opening in said tubular member, said opening in said valve member being positioned in substantial alignment with the longitudinal axis of said lever arm in a manner to facilitate the assembling of said tubular member and said housing.

In testimony whereof I have signed my name to this specification on this 12th day of February, A. D. 1926.

PATRICK M. GRANT.